(12) United States Patent
Cho et al.

(10) Patent No.: US 6,922,647 B2
(45) Date of Patent: Jul. 26, 2005

(54) DEVICE AND METHOD FOR AUTOMATICALLY DETECTING A CALIBRATION TERMINATION FOR A GEOMAGNETIC SENSOR

(75) Inventors: Woo-jong Cho, Suwon (KR); Sang-on Choi, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/682,478

(22) Filed: Oct. 10, 2003

(65) Prior Publication Data
US 2004/0107064 A1 Jun. 3, 2004

(30) Foreign Application Priority Data
Nov. 28, 2002 (KR) .............................. 10-2002-0074890

(51) Int. Cl.⁷ .............................................. G01C 17/38
(52) U.S. Cl. ............................ 702/92; 702/85; 702/94; 702/104; 33/355 R; 324/202; 324/260
(58) Field of Search ........................... 702/92, 93, 85, 702/94, 104; 33/356, 361, 355 R; 324/255, 253, 260, 202

(56) References Cited

U.S. PATENT DOCUMENTS

| | | | | | |
|---|---|---|---|---|---|
| 4,414,753 A | * | 11/1983 | Moulin et al. | ................ | 33/356 |
| 4,831,563 A | * | 5/1989 | Ando et al. | ................... | 702/93 |
| 6,282,496 B1 | * | 8/2001 | Chowdhary | ................. | 701/220 |
| 6,282,803 B1 | * | 9/2001 | Dunne | ......................... | 33/361 |

* cited by examiner

Primary Examiner—John Barlow
Assistant Examiner—Hien Vo
(74) Attorney, Agent, or Firm—Lee & Morse, P.C.

(57) ABSTRACT

A device for automatically detecting a calibration termination of a geomagnetic sensor includes a detection unit for detecting signals X and Y outputted from X-axis and Y-axis coils of the geomagnetic sensor, respectively, a calculation unit for calculating slopes dX/dt and dY/dt of the signals X and Y, respectively, and the number of sign changes $N_x$ and $N_y$ of the slope dX/dt of the signal X and the slope dY/dt of the signal Y, respectively, a display unit for displaying the calibration termination and a calibration progress state for the geomagnetic sensor, and a control unit for outputting a driving signal to the display unit to display a state of the calibration termination based on the slope dX/dt of the signal X and the slope dY/dt of the signal Y and the number of slope sign changes $N_x$ and $N_y$.

10 Claims, 4 Drawing Sheets

DEVICE AND METHOD FOR AUTOMATICALLY DETECTING A CALIBRATION TERMINATION FOR A GEOMAGNETIC SENSOR

BACKGROUND OF THE INVENTION

1. Field of the Invention

The present invention relates to a device and a method for automatically detecting the termination of a calibration of a geomagnetic sensor. More particularly, the present invention relates to a device and a method capable of detecting the progress of a calibration using slopes of signals outputted from a geomagnetic sensor and the number of slope sign changes, and automatically terminating the calibration.

2. Description of the Related Art

A geomagnetic sensor is a direction search means, and is used in an electronic compass, navigation systems, satellite antenna controls, robot direction controls, game devices, portable terminals, personal digital assistants (PDAs), notebooks, and the like. As alternatives to a geomagnetic sensor, there are speed sensors, gyro sensors, global positioning systems (GPS), and so on, for use as direction search means. In particular, GPS is a world-wide position-determining system using satellites, which has the advantages of no position error accumulation and relatively low price. GPS is used in a wide range of fields, such as in vehicles, vessels, airplanes, construction equipment, notebook computers, and the like. However, GPS has limitations in that it is not able to estimate positions around buildings or in tunnels where electric waves are not received, has a position error of as much as 100 meters, among others. Accordingly, in order to compensate for these limitations, a geomagnetic sensor, an optical fiber gyro, or similar device is used as a sensor for direction measurements, and the GPS and an electronic map are used in combination, to thereby realize high-precision positioning.

A geomagnetic sensor uses a magnetic needle to detect the direction of the magnetic field produced by the Earth, which enables the absolute azimuth to be obtained from the signal X and signal Y that the X-axis coil and Y-axis coil, respectively, of the geomagnetic sensor generate. However, the geomagnetic sensor is easily affected by ambient magnetic fields of buildings, iron bridges, subway trains, and other similar sources, and the output signals of the geomagnetic sensor vary frequently depending upon an assembly state, declined degrees, or measurement environments of the sensor. Accordingly, the geomagnetic sensor must be calibrated to obtain precise orientation measurements.

FIG. 1 shows a conventional calibration process for a geomagnetic sensor. In a calibration process for a geomagnetic sensor, after the sensor is turned once or twice, the process measures output signals X and Y, and calculates calibration factors of offset and scale using a calibration algorithm. In subsequent measurements, the calibration factors are used for calibration so that the signals of the geomagnetic sensor become precise direction change values.

The conventional calibration process detects a calibration termination state based on a user's intuition or the detection of whether maximum values are repeated.

First, use of the user's intuition is a method in which the user turns a geomagnetic sensor once or twice. This method does not provide an easy calibration process since the user does not know the progress of the calibration process, i.e., the calibration progress state, which often leads to the calibration process not being properly performed.

The method of detecting whether the maximum values are repeated detects the progress of the calibration process, i.e., the calibration progress state, using the number of times repeated maximum and minimum values of signals are output from a geomagnetic sensor. This method relies on the fact that the maximum and minimum values for calculating the calibration state are directly associated with calibration factors. Accordingly, since the maximum and minimum values change depending upon calibration environments and the errors of the calibration factors are induced when the changing values are used in monitoring the calibration process, situations occur when the sensor is not able to detect precise calibration factors nor calculate the termination of the calibration process, i.e., the calibration termination state.

SUMMARY OF THE INVENTION

The present invention has been developed in an effort to solve at least some of the above problems, so it is a feature of an embodiment of the present invention to provide a device and method capable of automatically detecting the progress of a calibration process using the number of slope sign changes with respect to output signals of a geomagnetic sensor, and then notifying a user of the detection.

In order to provide the above feature an embodiment of the present invention provides a device for automatically detecting a calibration termination of a geomagnetic sensor including a detection unit for detecting signals X and Y outputted from X-axis and Y-axis coils of the geomagnetic sensor, respectively, a calculation unit for calculating slopes $dX/dt$ and $dY/dt$ of the signals X and Y, respectively, and the number of sign changes $N_x$ and $N_y$ of the slope $dX/dt$ of the signal X and the slope $dY/dt$ of the signal Y, respectively, a display unit for displaying the calibration termination and a calibration progress state for the geomagnetic sensor, and a control unit for outputting a driving signal to the display unit to display a state of the calibration termination based on the slope $dX/dt$ of the signal X and the slope $dY/dt$ of the signal Y and the number of slope sign changes $N_x$ and $N_y$.

Preferably, the detection unit detects the number of revolutions $N_s$ of the geomagnetic sensor when the geomagnetic sensor revolves more than once for calibration implementation of the geomagnetic sensor.

Preferably, the control unit outputs the driving signal to the display unit to display the calibration progress state when the number of sign changes $N_x$ of the slope $dX/dt$ of the signal X and the number of sign changes $N_y$ of the slope $dY/dt$ of the signal Y are both less than $2N_s$.

Further, the control unit may output the driving signal to the display unit to display the calibration termination state, and output a control signal to the detection unit to stop detecting signals, when the number of sign changes $N_x$ of the slope $dX/dt$ of the signal X and the number of sign changes $N_y$ of the slope $dY/dt$ of the signal Y both equal $2N_s$, and the slope $dX/dt$ of the signal X and the slope $dY/dt$ of the signal Y are each identical to approximate values of an initial slope $dX_0/dt$ of the signal X and an initial slope $dY_0/dt$ of the signal Y, respectively.

Preferably, the calculation unit includes a slope calculator for calculating the slopes $dX/dt$ and $dY/dt$ of the signals X and Y, respectively, inputted from the detection unit, a sign change number-of-times calculator for detecting points at which the sign of the slope $dX/dt$ of the signal X and the sign the slope $dY/dt$ of the signal Y change from positive to negative or negative to positive, and for outputting the number of slope sign changes $N_x$ and $N_y$, and a comparator for comparing the slope dX/dt of the signal X and the slope dY/dt of the signal Y with reference sinusoidal and cosine functions, and for calculating a signal corresponding to the calibration progress state.

In order to provide the above feature, an embodiment of the present invention provides a method for automatically detecting a calibration termination for a geomagnetic sensor including detecting signals X and Y outputted from X-axis and Y-axis coils of the geomagnetic sensor, respectively, calculating slopes dX/dt and dY/dt of the signals X and Y, respectively, and the number of sign changes $N_x$ and $N_y$ of the slope dX/dt of the signal X and the slope dY/dt of the signal Y, respectively, deciding a calibration termination timing based on the slopes dX/dt and dY/dt of the signals X and Y and the number of slope sign changes $N_x$ and $N_y$, and displaying the calibration termination and a calibration progress state for the geomagnetic sensor.

Preferably, the detection step detects the number of revolutions $N_s$ of the geomagnetic sensor when the geomagnetic sensor revolves more than once for calibration implementation of the geomagnetic sensor.

Preferably, the decision step outputs a corresponding signal to display the calibration progress state on a display unit when the number of sign changes $N_x$ of the slope dX/dt of the signal X and the number of sign changes $N_y$ of the slope dY/dt of the signal Y are both less than $2N_s$.

Further, the decision step may output a driving signal to display the calibration termination state, and output a control signal to stop detecting an input signal, when the number of sign changes $N_x$ of the slope dX/dt of the signal X and the number of sign changes $N_y$ of the slope dY/dt of the signal Y both equal $2N_s$, and the slope dX/dt of the signal X and the slope dY/dt of the signal Y are identical to approximate values of an initial slope $dX_0/dt$ of the signal X and an initial slope $dY_0/dt$ of the signal Y, respectively.

Preferably, the calculation step includes calculating the slopes dX/dt and dY/dt of the signals X and Y, respectively, detecting points at which the sign of the slope dX/dt of the signal X and the sign of the slope dY/dt of the signal Y change from positive to negative or negative to positive, and outputting the number of slope sign changes $N_x$ and $N_y$, and comparing the slope dX/dt of the signal X and the slope dY/dt of the signal Y with reference sinusoidal and cosine functions, and calculating a signal corresponding to the calibration progress state.

BRIEF DESCRIPTION OF THE DRAWINGS

The above and other features and advantages of the present invention will become more apparent to those of ordinary skill in the art by describing in detail a preferred embodiment thereof with reference to the attached drawings in which.

DETAILED DESCRIPTION OF THE INVENTION

Korean Patent Application No. 2002-74890, filed on Nov. 28, 2002, and entitled: "Device and Method for Automatically Detecting a Calibration Termination for a Geomagnetic Sensor," is incorporated by reference herein in its entirety.

The present invention will now be described more fully hereinafter with reference to the accompanying drawings, in which a preferred embodiment of the invention is shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
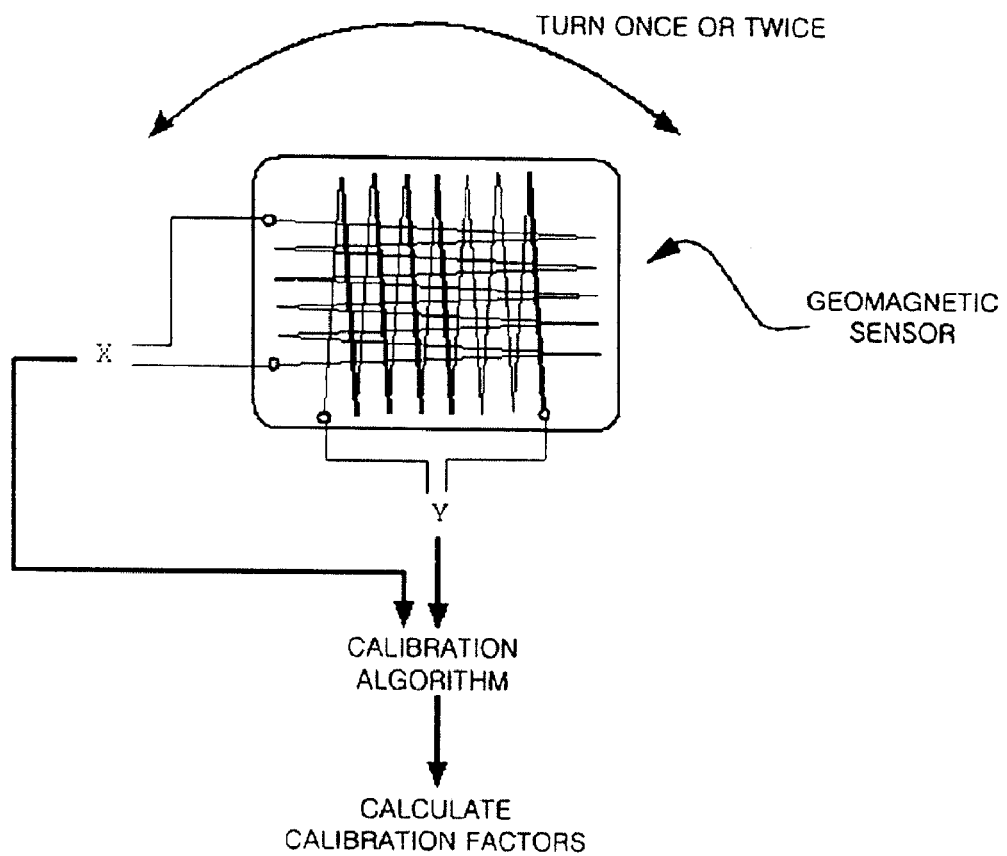
FIG. 1 is a view for schematically showing a conventional calibration process for a geomagnetic sensor.
Figure 2:
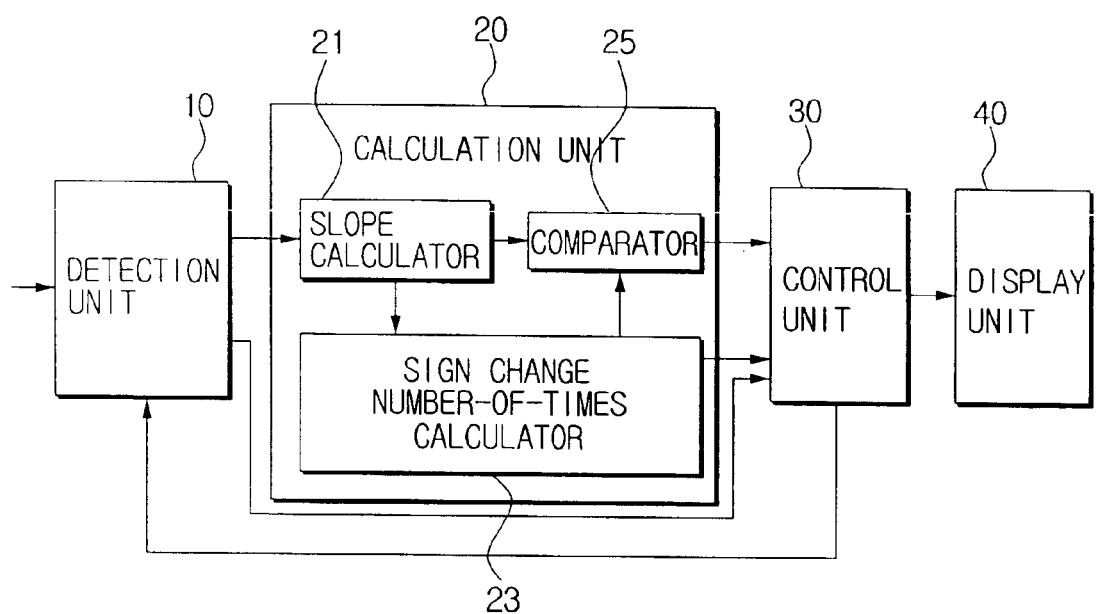
FIG. 2 is a block diagram for showing a device for automatically detecting the termination of a calibration process for a geomagnetic sensor according to an embodiment of the present invention.

FIG. 2 is a block diagram for showing a device for automatically detecting a calibration termination of a geomagnetic sensor according to an embodiment of the present invention. In FIG. 2, a device for automatically detecting a calibration termination for the present geomagnetic sensor includes a detection unit 10, a calculation unit 20, a control unit 30, and a display unit 40.

In operation, the detection unit 10 detects signals X and Y. Next, the calculation unit 20 calculates the slopes dX/dt and dY/dt of the detected signals X and Y, respectively, and the number of times a sign of the slope changes from positive to negative or negative to positive, $N_x$ and $N_y$, respectively. The control unit 30 outputs a control signal corresponding to the calibration termination and the calibration progress state on the basis of the slopes dX/dt and dY/dt and the number of slope sign changes $N_x$ and $N_y$. Then, the display unit 40 displays the calibration termination and the calibration progress state for the geomagnetic sensor.

Figure 3A:
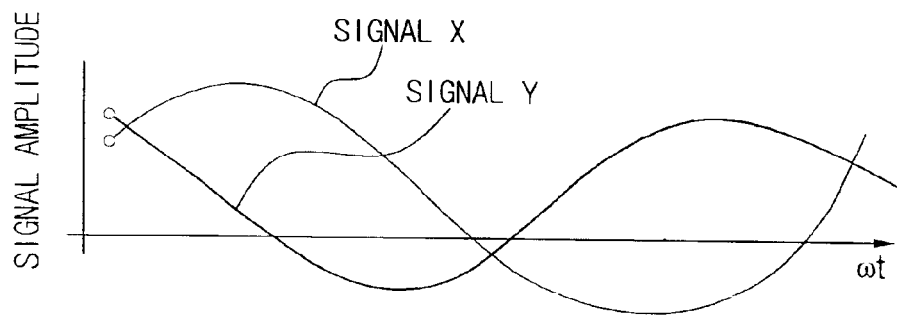
FIG. 3A is a graph of signals X and Y outputted from an X-axis coil and a Y-axis coil, respectively, of a geomagnetic sensor.

FIG. 3A is a graph of signals X and Y outputted from an X-axis coil and a Y-axis coil, respectively, of a geomagnetic sensor in a calibration-implementing process. When only pure terrestrial magnetism is detected, without being affected by any external magnetic field, the outputted signals X and Y appear in the waveforms of sinusoidal and cosine functions having the same amplitude and period, and the signals X and Y have only a phase difference of 90°. However, exemplary signals X and Y output by a geomagnetic sensor are influenced by surrounding magnetic fields and the measurement environments, as shown in FIG. 3A. The signals X and Y of FIG. 3A may be expressed in the following equations.

$$X = A \sin \omega t + \alpha, \quad Y = B \cos \omega t + \beta \qquad \text{[Formula 1]}$$

The signals X and Y draw the waveforms of sinusoidal and cosine functions having different amplitudes and reference axes from each other, and have a phase difference of 90°.

Referring back to FIG. 2, as a calibration process starts, the detection unit 10 detects and outputs to the calculation unit 20 the signals X and Y outputted from the X-axis coil and the Y-axis coil, respectively, of a geomagnetic sensor. Further, the detection unit 10 detects and outputs to the control unit 30 the number of revolutions $N_s$ of the geomagnetic sensor when the geomagnetic sensor revolves more than once for the calibration implementation of the geomagnetic sensor.

The calculation unit 20 has a slope calculator 21 for calculating the slopes dX/dt and dY/dt of the signals X and Y, respectively, a sign change number-of-times calculator 23 for calculating the number of slope sign changes, and a comparator 25 for calculating a signal corresponding to a calibration progress state.

The slope calculator 21 differentiates signals X and Y expressed in Formula 1 with respect to time to calculate values. Accordingly, the slopes dX/dt and dY/dt are expressed in the following equations.

$$\frac{dX}{dt} = A\omega \cos \omega t, \quad \frac{dY}{dt} = -B\omega \sin \omega t \quad [\text{Formula 2}]$$

Figure 3B:
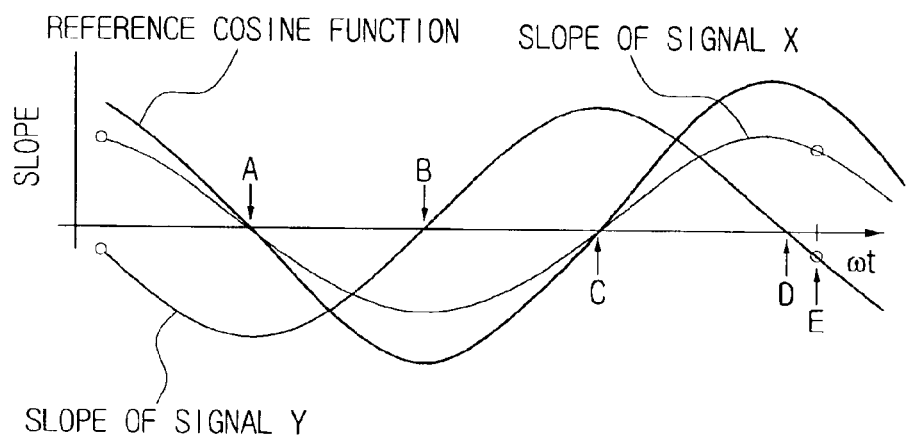
FIG. 3B is a graph of the slopes of signals X and Y and a reference cosine function according to an embodiment of the present invention.

FIG. 3B is a graph of the slopes dX/dt and dY/dt of the signals X and Y, respectively, expressed in Formula 2 and a reference cosine function.

Figure 3C:
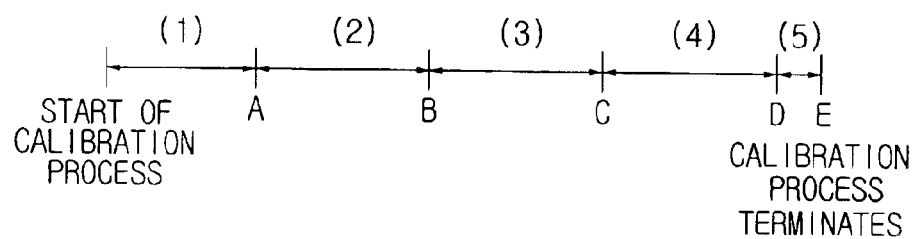
FIG. 3C is a view for showing a calibration termination process for a geomagnetic sensor according to an embodiment of the present invention.

The sign change number-of-times calculator 23 detects points at which the signs of the slopes dX/dt and dY/dt of the signals X and Y change from positive to negative or negative to positive. More specifically, the sign change number-of-times calculator 23 detects the points at which the respective slopes become zero (0) and calculates the number of each of the sign changes $N_x$ and $N_y$. In FIG. 3B, the slope dX/dt of the signal X has a first sign change ($N_x=1$) from positive to negative at point A and has a second sign change ($N_x=2$) from negative to positive at point C. Similarly, the slope dY/dt of the signal Y has a first sign change ($N_y=1$) from negative to positive at point B and has a second sign change ($N_y=2$) from positive to negative at point D. As may be seen in FIG. 3B, the slope sign changes of the signals occur at intervals of 90°. FIG. 3C shows the points A, B, C, and D at which the signs of the slopes change between the calibration-starting point and the calibration-ending point.

The comparator 25 compares the changes in the slopes dX/dt and dY/dt of the signals X and Y, respectively, with the reference sinusoidal and cosine functions at 90° intervals (sections (1), (2), (3), (4), and (5) of FIG. 3B) and calculates a signal corresponding to a calibration progress state. FIG. 3B shows the comparison of the slope of the signal X, the slope of the signal Y, and the reference cosine function.

The control unit 30 outputs a driving signal to display a calibration progress state on the display unit when the number of sign changes $N_x$ of the slopes dX/dt of the signal X and the number of sign changes $N_y$ of the slope dY/dt of the signal Y are less than predetermined values. Preferably, when the number of sign changes $N_x$ and $N_y$ are less than $2N_s$, a driving signal is output to display a calibration progress state on the display unit.

Further, the control unit 30 recognizes the close approach to a calibration termination timing when the number of sign changes $N_x$ of the slope dX/dt of the signal X and the number of sign changes $N_y$ of the slope dY/dt of the signal Y both equal $2N_s$ (point D of FIG. 3B). Further, when the slope dX/dt of the signal X and the slope dY/dt of the signal Y are identical to the approximate values of an initial slope $dX_0/dt$ of the signal X and an initial slope $dY_0/dt$ of the signal Y respectively, the control unit 30 terminates the calibration process. When the number of revolutions of a geomagnetic sensor is one (1), the control unit 30 decides that the calibration is terminated, around point E of FIG. 3B, outputs a driving signal to display the calibration termination state on the display unit 40, and outputs a control signal to the detection unit 10 to stop detecting signals.

The display unit 40 displays the calibration progress state during the calibration progress according to the control signal, and displays the calibration termination state if the calibration is terminated.

A method for automatically detecting the calibration termination of a geomagnetic sensor according to the present invention includes detecting signals X and Y, calculating the number of sign changes $N_x$ and $N_y$ of the slopes dX/dt and dY/dt of the signals X and Y, respectively, deciding a calibration termination timing, and displaying the calibration termination and the calibration progress state of the geomagnetic sensor.

Figure 4:
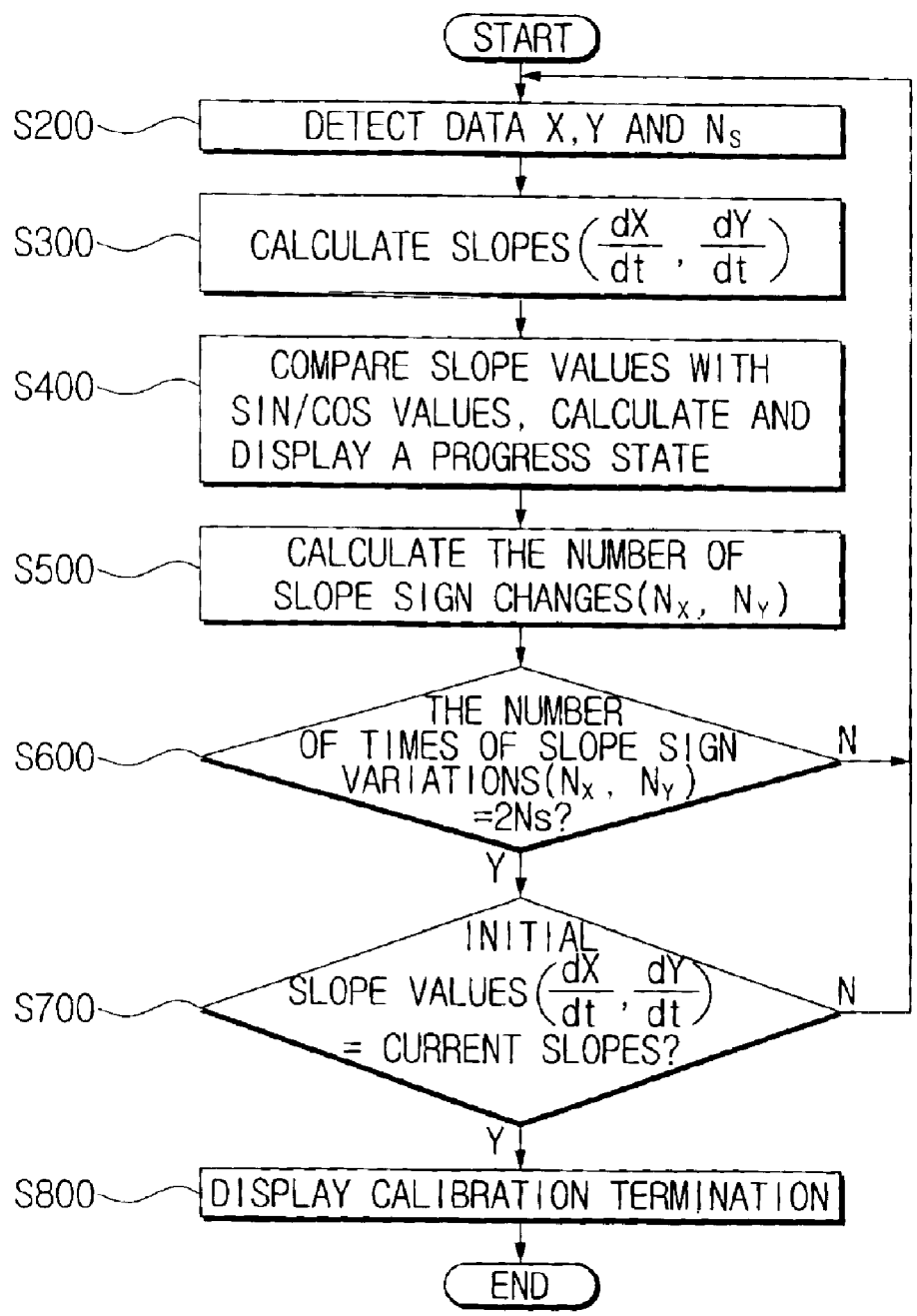
FIG. 4 is a flow chart for monitoring a calibration process and detecting a calibration termination according to an embodiment of the present invention.

FIG. 4 is a flow chart for explaining a method for displaying the progress state and termination timing of a calibration process for a geomagnetic sensor according to an embodiment of the present invention. Referring to FIG. 4, the method for automatically detecting the calibration termination of the geomagnetic sensor includes a data detection step S200, calculation steps S300, S400, and S500, decision steps S600 and S700, and a display step S800.

The calibration process for a geomagnetic sensor starts and progresses according to the flow chart of FIG. 4.

The data detection step S200 detects signals X and Y outputted from the X-axis and Y-axis coils of the geomagnetic sensor, respectively. If the geomagnetic sensor revolves at least more than once to implement the calibration of the geomagnetic sensor, the data detection step S200 detects the number of revolutions $N_s$ of the geomagnetic sensor.

The calculation steps S300, S400, and S500 include a slope calculation step S300, a comparison step S400, and a sign change number-of-times calculation step S500.

In the slope calculation step S300, the slopes of the signals X and Y are calculated as time-differentiated values dX/dt and dY/dt with respect to the signals X and Y, respectively.

The comparison step S400 compares the variations of the slope dX/dt of the signal X and the slope dY/dt of the signal Y with reference sinusoidal and cosine functions, and then calculates a signal corresponding to the calibration progress state.

The sign change number-of-times calculation step S500 calculates points at which the sign of the slope dX/dt of the signal X and the slope dY/dt of the signal Y change, that is, the points at which dX/dt=0 and dY/dt=0, respectively, and calculates the number of times the respective slope signs change $N_x$ and $N_y$.

The decision steps S600 and S700 decide a calibration termination timing based on the slopes dX/dt and dY/dt of the signals X and Y and the number of sign changes $N_x$ and $N_y$ of those slopes.

The decision step S600 decides whether the number of sign changes $N_x$ of the slope dX/dt of the signal X and the number of sign changes $N_y$ of the slope dY/dt of the signal Y are both equal to $2N_s$. When the number of slope sign changes $N_x$ and $N_y$ are both less than $2N_s$, the decision step S600 outputs a corresponding signal to display on the display unit the calculation progress state obtained from the comparison step S400. Alternately, when the number of slope sign changes $N_x$ and $N_y$ are both equal to $2N_s$, it is recognized to closely approach a calibration termination timing, and a next step progresses. In the next step, step S700, if the slope dX/dt of the signal X and the slope dY/dt of the signal Y are decided to be identical to the approximate values of an initial slope $dX_0/dt$ of the signal X and an initial slope $dY_0/dt$ of the signal Y, it is considered that the calibration is terminated. Accordingly, the step 700 outputs a driving signal for displaying the calibration termination state and a control signal for stopping detection of an input signal.

The display step S800 displays the calibration termination and the calibration progress state for the geomagnetic sensor according to a driving signal of the decision step S700.

As described above, a process for calibrating a geomagnetic sensor according to the present invention calculates the slopes and the number of slope sign changes for respective signals outputted from the X-axis and Y-axis coils of the geomagnetic sensor, detects the progress of the calibration process, and automatically terminates the calibration process, so that it can precisely notify users of the progress of the calibration implementation process and the termination state. Further, the device and method according to the present invention can be used in portable information terminals, such as hand-held phones, PDAs, notebooks, and the like, to calibrate a built-in geomagnetic sensor.

A preferred embodiment of the present invention has been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A device for automatically detecting a calibration termination of a geomagnetic sensor, comprising:
   a detection unit for detecting signals X and Y outputted from X-axis and Y-axis coils of the geomagnetic sensor, respectively;
   a calculation unit for calculating slopes dX/dt and dY/dt of the signals X and Y, respectively, and the number of sign changes $N_x$ and $N_y$ of the slope dX/dt of the signal X and the slope dY/dt of the signal Y, respectively;
   a display unit for displaying the calibration termination and a calibration progress state for the geomagnetic sensor; and
   a control unit for outputting a driving signal to the display unit to display a state of the calibration termination based on the slope dX/dt of the signal X and the slope dY/dt of the signal Y and the number of slope sign changes $N_x$ and $N_y$.

2. The device as claimed in claim 1, wherein the detection unit detects the number of revolutions $N_s$ of the geomagnetic sensor when the geomagnetic sensor revolves more than once for calibration implementation of the geomagnetic sensor.

3. The device as claimed in claim 2, wherein the control unit outputs the driving signal to the display unit to display the calibration progress state when the number of sign changes $N_x$ of the slope dX/dt of the signal X and the number of sign changes $N_y$ of the slope dY/dt of the signal Y are both less than $2N_s$.

4. The device as claimed in claim 2, wherein the control unit outputs the driving signal to the display unit to display the calibration termination state, and outputs a control signal to the detection unit to stop detecting signals, when the number of sign changes $N_x$ of the slope dX/dt of the signal X and the number of sign changes $N_y$ of the slope dY/dt of the signal Y both equal $2N_s$, and the slope dX/dt of the signal X and the slope dY/dt of the signal Y are each identical to approximate values of an initial slope $dX_0/dt$ of the signal X and an initial slope $dY_0/dt$ of the signal Y, respectively.

5. The device as claimed in claim 1, wherein the calculation unit comprises:
   a slope calculator for calculating the slopes dX/dt and dY/dt of the signals X and Y, respectively, inputted from the detection unit;
   a sign change number-of-times calculator for detecting points at which the sign of the slope dX/dt of the signal X and the sign the slope dY/dt of the signal Y change from positive to negative or negative to positive, and for outputting the number of slope sign changes $N_x$ and $N_y$; and
   a comparator for comparing the slope dX/dt of the signal X and the slope dY/dt of the signal Y with reference sinusoidal and cosine functions, and for calculating a signal corresponding to the calibration progress state.

6. A method for automatically detecting a calibration termination for a geomagnetic sensor, comprising:
   detecting signals X and Y outputted from X-axis and Y-axis coils of the geomagnetic sensor, respectively;
   calculating slopes dX/dt and dY/dt of the signals X and Y, respectively, and the number of sign changes $N_x$ and $N_y$ of the slope dX/dt of the signal X and the slope dY/dt of the signal Y, respectively;
   deciding a calibration termination timing based on the slopes dX/dt and dY/dt of the signals X and Y and the number of slope sign changes $N_x$ and $N_y$; and
   displaying the calibration termination and a calibration progress state for the geomagnetic sensor.

7. The method as claimed in claim 6, wherein the detection step detects the number of revolutions $N_s$ of the geomagnetic sensor when the geomagnetic sensor revolves more than once for calibration implementation of the geomagnetic sensor.

8. The method as claimed in claim 7, wherein the decision step outputs a corresponding signal to display the calibration progress state on a display unit when the number of sign changes $N_x$ of the slope dX/dt of the signal X and the number of sign changes $N_y$ of the slope dY/dt of the signal Y are both less than $2N_s$.

9. The method as claimed in claim 7, wherein the decision step outputs a driving signal to display the calibration termination state, and outputs a control signal to stop detecting an input signal, when the number of sign changes $N_x$ of the slope dX/dt of the signal X and the number of sign changes $N_y$ of the slope dY/dt of the signal Y both equal $2N_s$, and the slope dX/dt of the signal X and the slope dY/dt of the signal Y are identical to approximate values of an initial slope $dX_0/dt$ of the signal X and an initial slope $dY_0/dt$ of the signal Y, respectively.

10. The method as claimed in claim 7, wherein the calculation step comprises:
    calculating the slopes dX/dt and dY/dt of the signals X and Y, respectively;
    detecting points at which the sign of the slope dX/dt of the signal X and the sign of the slope dY/dt of the signal Y change from positive to negative or negative to positive, and outputting the number of slope sign changes $N_x$ and $N_y$; and
    comparing the slope dX/dt of the signal X and the slope dY/dt of the signal Y with reference sinusoidal and cosine functions, and calculating a signal corresponding to the calibration progress state.

* * * * *